(12) United States Patent
Kalbac

(10) Patent No.: US 11,403,208 B2
(45) Date of Patent: Aug. 2, 2022

(54) GENERATING A VIRTUALIZED STUB SERVICE USING DEEP LEARNING FOR TESTING A SOFTWARE MODULE

(71) Applicant: MASTERCARD INTERNATIONAL INCORPORATED, Purchase, NY (US)

(72) Inventor: John C. Kalbac, O'Fallon, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 99 days.

(21) Appl. No.: 16/690,539

(22) Filed: Nov. 21, 2019

(65) Prior Publication Data

US 2021/0157712 A1    May 27, 2021

(51) Int. Cl.
*G06F 11/36* (2006.01)
*G06N 3/04* (2006.01)
*G06F 9/455* (2018.01)
*G06N 3/08* (2006.01)

(52) U.S. Cl.
CPC .......... *G06F 11/3664* (2013.01); *G06F 9/455* (2013.01); *G06F 11/3688* (2013.01); *G06N 3/04* (2013.01); *G06N 3/08* (2013.01)

(58) Field of Classification Search
None
See application file for complete search history.

(56) References Cited

U.S. PATENT DOCUMENTS

| 7,954,091 | B2 | 5/2011 | Li et al. |
| 7,996,816 | B2 | 8/2011 | Francis et al. |
| 8,112,262 | B1 * | 2/2012 | Michelsen .......... G06F 11/3457 703/13 |
| 9,015,532 | B2 | 4/2015 | Hong |
| 9,117,177 | B1 * | 8/2015 | Carr .................... G06F 11/3688 |
| 9,208,044 | B2 | 12/2015 | Shanbhag |
| 9,419,884 | B1 | 8/2016 | Li et al. |

(Continued)

FOREIGN PATENT DOCUMENTS

WO    WO2017144432 A1    8/2018

OTHER PUBLICATIONS

Colosimo, "Revolutionizing API Testing with Artificial Intelligence," DZone, May 2, 2018, 7 pages.

*Primary Examiner* — Lewis A Bullock, Jr.
*Assistant Examiner* — Mark A Gooray

(57) ABSTRACT

The disclosure herein describes generating a virtualized stub service based on deep learning for use in simulating a service during testing of a software module configured to interact with the service. Request-response pairs between the software module and the service are captured by an interceptor module, each request-response pair including a request and a response to the request. The captured request-response pairs are added to a training data set. A service virtualization engine trains a request categorization model based on the training data set, wherein the request categorization model is trained to respond to requests with responses based on the request-response pairs of the training data set. Then, a virtualized stub service is generated for the service based on the trained request categorization model. The disclosure provides for automatic generation of virtualized stub services using deep learning techniques for use in testing software modules.

20 Claims, 5 Drawing Sheets

(56) References Cited

U.S. PATENT DOCUMENTS

| | | | |
|---|---|---|---|
| 9,934,135 B2 | 4/2018 | Ganda et al. | |
| 9,959,198 B1 | 5/2018 | Jha et al. | |
| 10,031,831 B2 | 7/2018 | Greene et al. | |
| 10,110,447 B2 | 10/2018 | Konecny | |
| 10,394,583 B2 * | 8/2019 | Lau | G06F 11/30 |
| 2007/0169015 A1 | 7/2007 | Seelig et al. | |
| 2008/0115114 A1 | 5/2008 | Palaparthi et al. | |
| 2014/0063027 A1 * | 3/2014 | Becker | G06F 9/505 |
| | | | 345/520 |
| 2015/0128103 A1 | 5/2015 | Stratton et al. | |
| 2017/0234251 A1 * | 8/2017 | Commenda | G05B 17/02 |
| | | | 701/33.1 |
| 2018/0113799 A1 | 4/2018 | Shankar et al. | |
| 2018/0196731 A1 | 7/2018 | Moorthi et al. | |
| 2018/0349256 A1 | 12/2018 | Fong | |
| 2021/0042210 A1 * | 2/2021 | Chang | G06F 11/3664 |

* cited by examiner

GENERATING A VIRTUALIZED STUB SERVICE USING DEEP LEARNING FOR TESTING A SOFTWARE MODULE

BACKGROUND

Testing and validation are a substantial challenge for web service application programming interface (API) development. With the popularity of micro-service architecture, the issue only becomes more complex as the number of independent services quickly grows. Testing and development efforts are burdened with increased integration testing to ensure services remain functional and compliant. As services can be versioned and deployed independently, regression coverage becomes extremely important. Additionally, services under development may be dependent on external services that simply do not exist yet.

Further, contract testing, a popular solution to the service integration dilemma, requires the creation of contracts, often defined by the API consumers themselves. These contracts are executed as tests during development and any identified issues are corrected. However, contract testing presents a challenge: timely and accurate contract creation. Contracts are often generated manually or derived from the API specification. While consumers may provide sample contracts, this level of collaboration is difficult for newly created APIs. Contracts must also be reviewed and maintained for accuracy on a continuous basis. Human error becomes a factor as contracts could be erroneously edited. Further, deriving contracts from the API specification creates a dependency on the type and format for specification publication.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for generating a virtualized stub service based on deep learning for use in simulating a service during testing of a software module configured to interact with the service is described. Request-response pairs between the software module and the service are captured by an interceptor module, each request-response pair including a request and a response to the request. The captured request-response pairs are then added to a training data set. A service virtualization engine trains a request categorization model based on the training data set, wherein the request categorization model is trained to respond to requests with responses based on the request-response pairs of the training data set. Then, a virtualized stub service is generated for the service based on the trained request categorization model, wherein the virtualized stub service is configured to respond to requests from the software module with responses during testing of the software module.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 5, the systems are illustrated as schematic drawings. The drawings may not be to scale.

DETAILED DESCRIPTION

Aspects of the disclosure provide a computerized method and system for generating a virtualized stub service based on deep learning for use in simulating a service during testing of a software module configured to interact with the service. Requests and responses sent between the software module and the service are captured by an interceptor module as request-response pairs and the captured request-response pairs are then added to a training data set. A service virtualization engine trains a request categorization model based on the training data set, wherein the request categorization model is trained to map requests to responses based on the request-response pairs of the training data set. Then, a virtualized stub service is generated for the service based on the trained request categorization model, wherein the virtualized stub service is configured to respond to requests from the software module with responses during testing of the software module.

The disclosure aims to address the challenges of service contract validation for fast-paced highly iterative development environments. For example, the disclosure simplifies and automates the generation of simulated or virtualized services. By utilizing deep learning classification algorithms, mocked response values are predicated given an input request. These dynamically created, versioned stub services provide development integration without the complexity of real services. The resulting simulation may be packaged and made available for consumer services to access during development and testing.

The disclosure operates in an unconventional way at least by automatically and dynamically generating virtualized stub services for use in testing that are consistently updated without the overhead of manual intervention. Maintenance requirements by users are reduced or even eliminated, and the generated stub services remain up-to-date and accurate based on the most recent captured requests and responses. Further, complex database integration and test setup requirements are avoided by providing the dynamically generated pattern-based responses.

Figure 1:
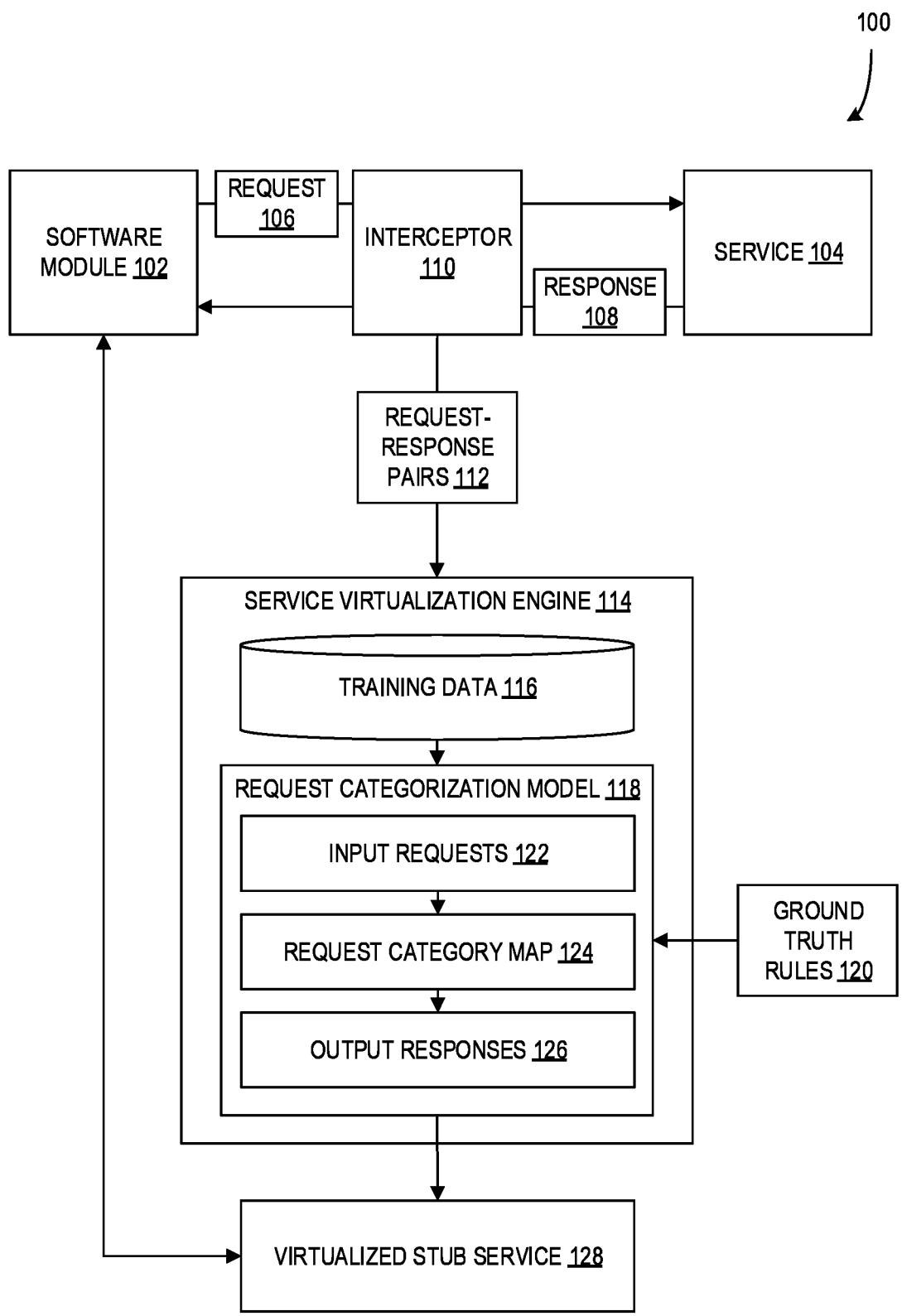
FIG. 1 is a block diagram illustrating a system configured for generating a virtualized stub service according to an embodiment.

FIG. 1 is a block diagram illustrating a system 100 configured for generating a virtualized stub service 128 according to an embodiment. The system 100 includes a software module 102 that is configured to send requests 106 to a service 104 and receive responses 108 from the service 104 in response to the requests 106. In some examples, the software module 102 is configured to depend on the responses 108 from the service 104 to perform operations, such that comprehensively testing the software module 102 requires that the software module 102 be provided with responses, such as response 108, to the requests 106 sent during such tests. The software module 102 and/or service 104 may be software components of a web site, an app on a mobile device, a service of a data server, a micro-service, or other software application or applications as would be understood by a person of ordinary skill in the art.

Further, the system includes interceptor(s) 110 that are configured to capture the requests 106 and responses 108 and provide them in request-response pairs 112 to the service virtualization engine 114, which is a model training engine. The interceptor 110 includes hardware, firmware, and/or software configured to intercept, capture, or otherwise read the data of the request 106 as it is sent from the software module 102 to the service 104, and the data of the response 108 as it is sent from the service 104 to the software module 102 without substantially interrupting the communication between the software module 102 and the service 104. In some examples, the interceptor 110 includes multiple software components that listen to and/or filter communications of other software components of the system 100 via the application program interfaces (APIs) or other similar communication interfaces of those software components. Alternatively, or additionally, software instructions configured for capturing request and response data may be built into the APIs of the software module 102 and/or the service 104 themselves. Such interceptor 110 software components may be implemented and/or executed in the system 100 in any manner that would be understood by a person of ordinary skill in the art without departing from the description herein.

In some examples, the requests 106 and responses 108 are captured by the interceptor 110 during the performance of existing tests of the software module 102 and/or the service 104, such as unit tests, regression tests, or other types of tests. Additionally, or alternatively, the requests 106 and responses 108 may be captured by the interceptor 110 during routine or general operation of the software module 102 and the service 104. Further, while only a single software module 102 and service 104 are illustrated, in some examples, the system 100 includes more or different instances of the software module 102 that send requests 106 to the service 104 and/or more or different instances of the service 104 that receive requests 106 from the software module 102 and responds with responses 108. For instance, the service 104 may be configured to receive requests from many different software modules and/or different versions of the software module 102, and the interceptor 110 may be configured to capture those received requests and any associated responses. Alternatively, or additionally, the software module 102 may be configured to send requests to many different services, and the interceptor 110 may be configured to capture those sent requests and any associated responses.

An example training annotation for a unit test is provided below:

```
@Test
@DLSV(trainingEnabled="true")
Public void testCheckInventory_InStock( ) {
Response response = sendRequest("""
{
    "items": {
        "item": [
            {
                "sku": "55-3156-513224",
                "quantity": 1
            }
        ]
```

-continued

```
        }
    }
""");
assertEquals(response.item[0].sku, "55-3156-513224");
assertEquals(response.item[0].availability,"IN_STOCK");
assertTrue(response.item[0].inventoryCount >= 1);
}
```

Based on the above example notation, which includes a Deep Learning Service Virtualization (DLSV) tag (the @DLSV line), the interceptor 110 may be notified or otherwise enabled to capture the sent request in the "sendRequest" function call and the associated response that is returned (e.g., the response element defined as the output of the "sendRequest" function). When this test is executed, the service virtualization engine 114 may be provided with the associated request-response pair 112.

In further examples, the system 100 is configured to generate a virtualized stub service 128 as described herein for specific APIs of the service 104. For instance, if the software module 102 is configured to interact with the service 104 via three different APIs, the system 100 may be configured to generate three different virtualized stub services 128 including one stub service 128 per API. Further, the system 100 may be configured to generate virtualized stub services 128 for all of the APIs that the software module 102 is configured to interact with, such that all of the API interactions of the software module 102 can be simulated using virtualized stub services 128 when testing.

The service virtualization engine 114 includes hardware, firmware, and/or software configured for training the request categorization model 118 using the training data 116. The interceptor 110 is configured to send the request-response pairs 112 to the service virtualization engine 114, where they are added to the training data 116. In some examples, the training data 116 includes request-response pairs 112 that have been received from the interceptor 110 over a defined time period (e.g., all the request-response pairs 112 received in the past 3 months). Alternatively, the training data 116 includes all request-response pairs 112 received without a time-based limitation.

The request-response pairs 112 in the training data 116 include the data of the associated request 106, the data of the response 108 that was sent in response to the request 106, and relationship data indicating the relationship between the request 106 and response 108 (e.g., a request 106 may be stored with a unique identifier of the associated response 108 and/or vice versa). The service virtualization engine 114 is configured to train the request categorization model 118 to respond to requests with appropriate responses, so maintaining this relationship data of the request-response pairs 112 is vital. Further, the data of the requests 106 and associated responses 108 of the request-response pairs 112 may include, for instance, identifiers of the requests and responses respectively, types of requests or responses, status data values (e.g., hypertext transfer protocol (HTTP) status codes), specific data values associated with the request (e.g., a code of an item to look up in a database), etc. The request-response pairs 112 stored in the training data 116 may further be timestamped (e.g., indicating when they were captured or added to the training data 116) and/or stored with other metadata, such as context data The request categorization model 118 is a software-based model that is trained by the service virtualization engine 114 based on the training data 116. In some examples, the request categorization model 118 is further trained based on ground truth rules 120 which define specific requests and fixed responses to the specific requests. It should be understood that ground truth rules 120 may be defined by a user to cover edge cases, negative scenarios, or other specific request-response scenarios that may rarely be present in the request-response pairs 112 of the training data 116. For instance, in an example where the interactions between the software module 102 and the service 104 are based on a HTTP protocol, a specific input request may be defined that triggers the request categorization model 118 to provide or simulate a "404 Not Found" response.

During and after the training process, the request categorization model 118 is configured to receive input requests 122, apply a request category map 124 to the input requests 122, which includes categorization or classification logic that maps requests 122 to output requests 126, and determine output responses 126 to the input requests 122 based on the application of the request category map 124. During the training process, the request category map 124 is altered, adjusted, or otherwise changed based on the training data 116, such that, after training is complete, application of the request category map 124 to input requests 122 yields output responses 126 that are the same as or at least substantially similar to the responses associated with the same input requests in the training data 116. The training of the request categorization model 118 and associated adjustments made to the request category map 124 may be based on analysis of the training data 116, identification of patterns of requests that are associated with particular responses or types of responses, etc. Further, in some examples, the training of the request categorization model 118 and adjustment of the request category map 124 is performed using deep learning classification algorithms and/or other machine learning techniques.

In some examples, the service virtualization engine 114 includes a machine learning module that comprises a trained regressor such as a random decision forest, a directed acyclic graph, a support vector machine, a convolutional neural network or other neural network, or another trained regressor. Such a trained regressor may be trained using the training data 116 as feedback data. It should further be understood that the machine learning module, in some examples, operates according to machine learning principles and/or techniques known in the art without departing from the systems and/or methods described herein. In further examples, the machine learning module of the service virtualization engine 114 engages in supervised training wherein the request-response pairs 112 and/or other associated training data 116 are used to determine categorization types of output responses that are provided in response to inputs by the trained request categorization model 118. Additionally, or alternatively, the machine learning module is configured to use active learning techniques based on defined filtering criteria to enable efficient training with reduced, filtered training sets for particular types of requests and responses (e.g., the model is trained to produce a status code 400 HTTP response to HTTP requests using a filtered training set that is associated with such status code 400 HTTP responses).

In an example, the machine learning module of the service virtualization engine 114 makes use of training data pairs when applying machine learning techniques and/or algorithms. Millions of training data pairs (or more) may be stored in a machine learning data structure. In some examples, a training data pair includes a timestamp-based feedback data value paired with an interval adjustment value. The pairing of the two values demonstrates a relationship between the feedback data value and the adjustment values that may be used by the machine learning module to determine future interval adjustments according to machine learning techniques and/or algorithms.

The virtualized stub service 128 is generated by the service virtualization engine 114 or an associated component of the system 100 based on the request categorization model 118. The virtualized stub service 128 is a software-based component that includes the exposed APIs and/or other interfaces of the service 104 such that the stub service 128 is configured to receive requests and provide responses to requests in substantially the same manner as the service 104. However, rather than including the same internal functionality of the service 104, the virtualized stub service 128 includes a copy or version of the trained request categorization model 118, enabling the virtualized stub service 128 to provide dynamic, up-to-date responses to requests based on consistent, automatic training of the model 118. The interfaces of the virtualized stub service 128 are directed to the model of the stub service 128 such that requests are provided to the model as input requests 122, a request category map 124 is applied to those input requests 122, and output responses 126 are determined as described above. The virtualized stub service 128 is further configured to direct the determined output responses from the model of the stub service 128 to APIs or other interfaces on which the service 104 is configured to send a response 108. In this way, from the perspective of the software module 102 or other software modules that interact with the service 104, the virtualized stub service 128 is configured to behave in the same manner as the service 104.

In some examples, the service virtualization engine 114 is configured to employ configurable parameters for tuning performance, accuracy, and repeatability of the request categorization model 118 and its associated output responses 126. Such configurable parameters may be set and/or adjusted by users during setup of the system 100 and even during operation of the system 100. The engine 114 may be configured to provide user access to such configurable parameters in the form of application parameters, build plugins, or other configuration interfaces as would be understood by a person of normal skill in the art. In further examples, to enable users to review and/or validate training results, the service virtualization engine 114 is configured to provide training and/or performance reporting to users periodically or on-demand. Such reporting includes providing metadata based on the output of the request categorization model 118 surrounding the classification and/or categorization of the training data 116. For instance, a training report is provided in the form of listed data pairs and/or associated charts, graphs, or the like, enabling users to visualize and better understand the training results.

In some examples, the virtualized stub service 128 and other generated stub services are associated with versions of the software module 102 and/or the service 104 for which they are generated. For instance, a first virtualized stub service 128 is generated based on the request-response pairs 112 collected from the software module 102 interacting with a first version of the service 104. Thus, the first virtualized stub service 128 is associated with the first version of the service 104. After the service 104 is upgraded to a second version, the service virtualization engine 114 may train the request categorization model 118 based on request-response pairs 112 collected from the interactions between the software module 102 and the second version of the service 104. The patterns of the request-response pairs 112 may have changed based on the change in version, such that the trained model 118 reflects the operations of the second version of the service 104, rather than the first version. The virtualized stub service 128 generated from this trained model 118 is associated with the second version of the service 104. The system 100 may maintain a plurality of the virtualized stub services 128 that are associated with different versions of modules and/or services to aid in performing complete suites of tests on the modules (e.g., testing the software module 102 may include testing it with the first virtualized stub service 128 and the second virtual stub service 128 to ensure that the module 102 works properly with both versions of the service 104). Additionally, or alternatively, such virtualized stub services 128 may be timestamped upon generation, and the timestamp information may be used when determining how to test the associated software module 102.

Figure 2A:
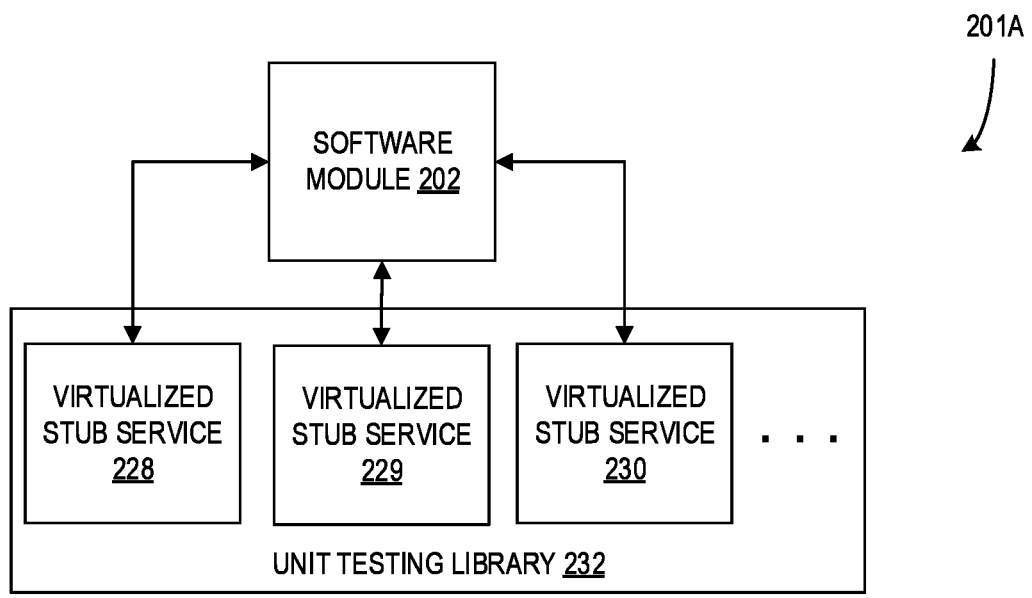
FIGS. 2A-B are block diagrams illustrating systems configured for testing software modules using virtualized stub services according to an embodiment.
Figure 2B:
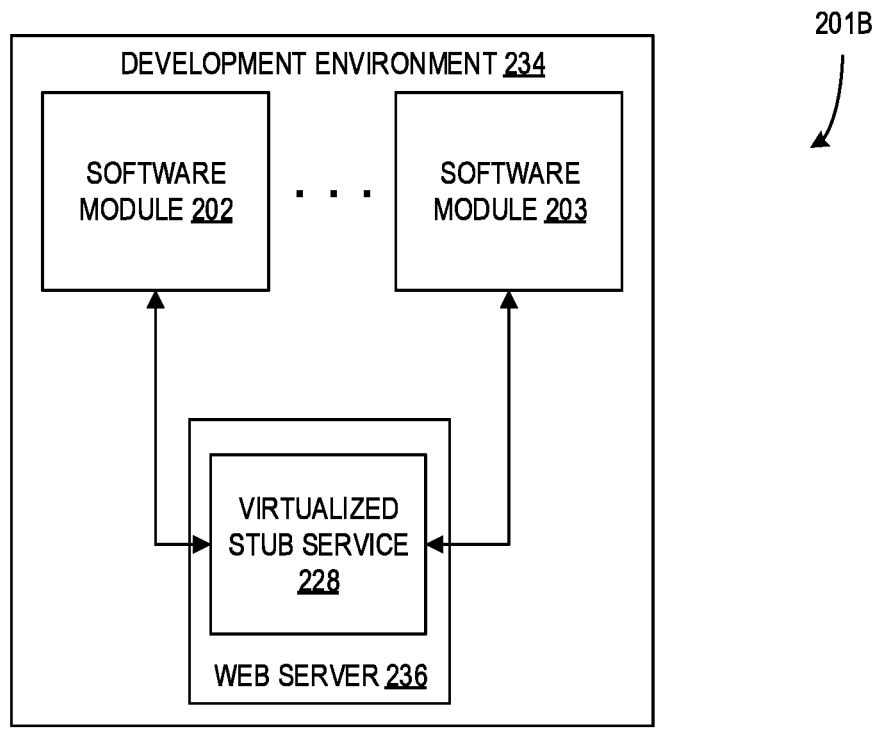

FIGS. 2A-B are block diagrams illustrating systems 201A and 201B configured for testing software modules 202-203 using virtualized stub services 228-230 according to an embodiment. In FIG. 2A, the system 201A includes a software module 202 that is interacting with the virtualized stub services 228, 229, and 230 of a unit testing library 232. The unit testing library 232 may be specifically packaged with and/or otherwise associated with the software module 202, such that it can be used when testing the software module 202 independently of other parts of a greater software system. The unit testing library 232 is illustrated as having three virtualized stub services 228-230, but in other examples, more, fewer, or different virtualized stub services may be included in the unit testing library 232 without departing from the description herein.

In some examples, the different virtualized stub services 228-230 of the unit testing library 232 include stub services that simulate multiple different APIs, other interfaces, or services with which the software module 202 is configured to interact, as described above (e.g., stub service 228 for checking inventory in a database and stub service 229 for looking up and/or authenticating a username-password combination). Alternatively, or additionally, the stub services 228-230 may include stub services that simulate different versions of the same service API or interface (e.g., stub service 228 for version 1.0 of an inventory checking service API, stub service 229 for version 2.0 of the inventory checking service API, and stub service 230 for version 3.0 of the inventory checking service API).

In some examples, the various virtualized stub services 228-230 of the unit testing library 232 are packaged with the source code of the software module 202 during compilation, providing an integrated, standalone testing library for use by the software module 202 that requires no external deployments or dependencies while providing test coverage for integration points of the module 202.

In FIG. 2B, a system 201B is illustrated that includes software modules 202-203 in a development environment 234. The development environment 234 further includes a virtualized stub service 228 that is deployed as a web service on a web server 236. The virtualized stub service 228 is configured to receive requests from the software modules 202-203 and respond with responses, as described above with respect to the virtualized stub service 128 of FIG. 1. The development environment 234 is illustrated as including two software modules 202-203, but in other examples, more, fewer, or different software modules may be included in the development environment 234 without departing from the description herein. Further, in some examples, the development environment 234 is configured to include a plurality of virtualized stub services deployed to the web server 236 or other web servers of the development environment. The plurality of virtualized stub services may be configured to simulate APIs or other interfaces of multiple types of services and/or multiple versions of the same service as described herein.

In some examples, the virtualized stub service 228 of the system 201B is compiled with a lightweight, embedded server component that enables it to behave as a web service on the web server 236 as illustrated (e.g., the stub service 228 may be in a JAVA Archive (JAR) or DOCKER image format, allowing for simple deployment on typical application containers). Such an implementation may be useful for integrated testing and/or regression testing in a development environment such as development environment 234 or the like.

Figure 3:
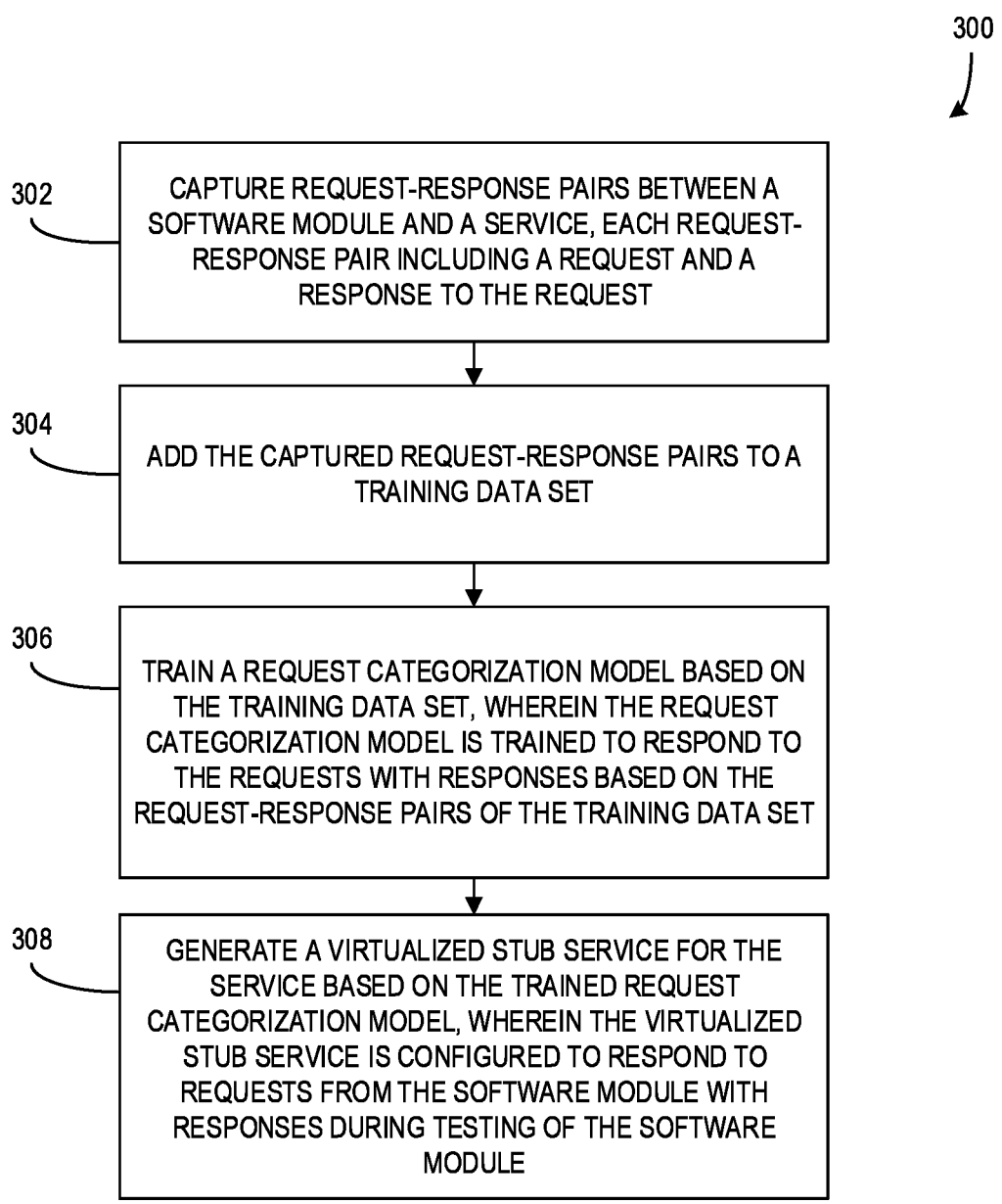
FIG. 3 is a flow chart illustrating a method of generating a virtualized stub service based on deep learning for simulating a service according to an embodiment.

FIG. 3 is a flow chart illustrating a method 300 of generating a virtualized stub service based on deep learning for simulating a service according to an embodiment. In some examples, the method 300 is implemented and/or executed by one or more components (the interceptor 110, the service virtualization engine 114, etc.) of a system such as system 100 described above. At 302, request-response pairs between a software module and a service are captured. Each request-response pair includes a request and a response to the request. The requests and responses of the request-response pairs may be captured by one or more interceptor components when they are sent between the software module and the service via APIs or other interfaces, as described herein. The requests and responses may be formatted according any protocol with which the software module and service are configured to communicate (e.g., HTTP protocol).

At 304, the captured request-response pairs are added to a training data set. The training data set may be stored in a database or other data store associated with a service virtualization engine as described above. Adding the request-response pairs to the training data set may include formatting the request-response pairs for uniform storage and use in the training data set. Further, additional metadata may be included with each request-response pair added to the training data set, such as a timestamp associated with the time the request and/or response were captured and/or a time associated with when they were added to the training data set.

At 306, a request categorization model is trained based on the training data set. The model is trained to respond to requests with responses based on the request-response pairs of the training data set. The training may include analysis of the request-response pairs to identify patterns and/or relationships between data values and/or metadata organization of associated requests and responses. Further, in some examples, the request-categorization model is trained using deep learning or other machine learning techniques as described above.

For instance, the request-response pairs of the training data set include several requests that include an "item in-stock" field, and the responses associated with the several requests include an "inventory count" field that contains an integer value representing the number of the items in stock. The result of such training data may be that the request categorization model is trained to respond to requests with the "item in-stock" field with a response that has an "inventory count" field. The training may extend to the integer value that is included in the "inventory count" field as well. For instance, the model is trained to insert the most common integer value of the training data set into the "inventory count" field, or it is trained to randomly or pseudo-randomly select from a list of possible integer values from the training data to include in the field when responding to "item in-stock" requests.

In further examples, the training of the request categorization model includes training the model to account for defined ground truth rules (e.g., ground truth rules 120). For instance, a ground truth rule is defined to identify any invalid formatting of a received request and, if invalid formatting is identified, the response provided includes an "invalid request format" message. The training of the model then results in the model evaluating the validity of the request format against this defined ground truth rule for every received request and automatically responding with the "invalid request format" response, rather than continuing to evaluate other identifiable patterns that may be present in the invalid request. For instance, even if an invalid request included an "item in-stock" field as described above, responding with an "inventory count" response is overridden by the enforcement of the "invalid format" ground truth rule.

At 308, after the request categorization model is trained, a virtualized stub service (e.g., virtualized stub service 128) based on the trained request categorization model is generated. The virtualized stub service is configured to respond to requests from the software module with responses during testing of the software module, as described herein.

In some examples, the request categorization model continues to be iteratively trained based on the training data set as new request-response pairs are captured and added to the training data set. As a result, new versions of the virtualized stub service may be generated over time and/or the current version of the virtualized stub service may be updated as the request categorization model is iteratively trained.

Figure 4:
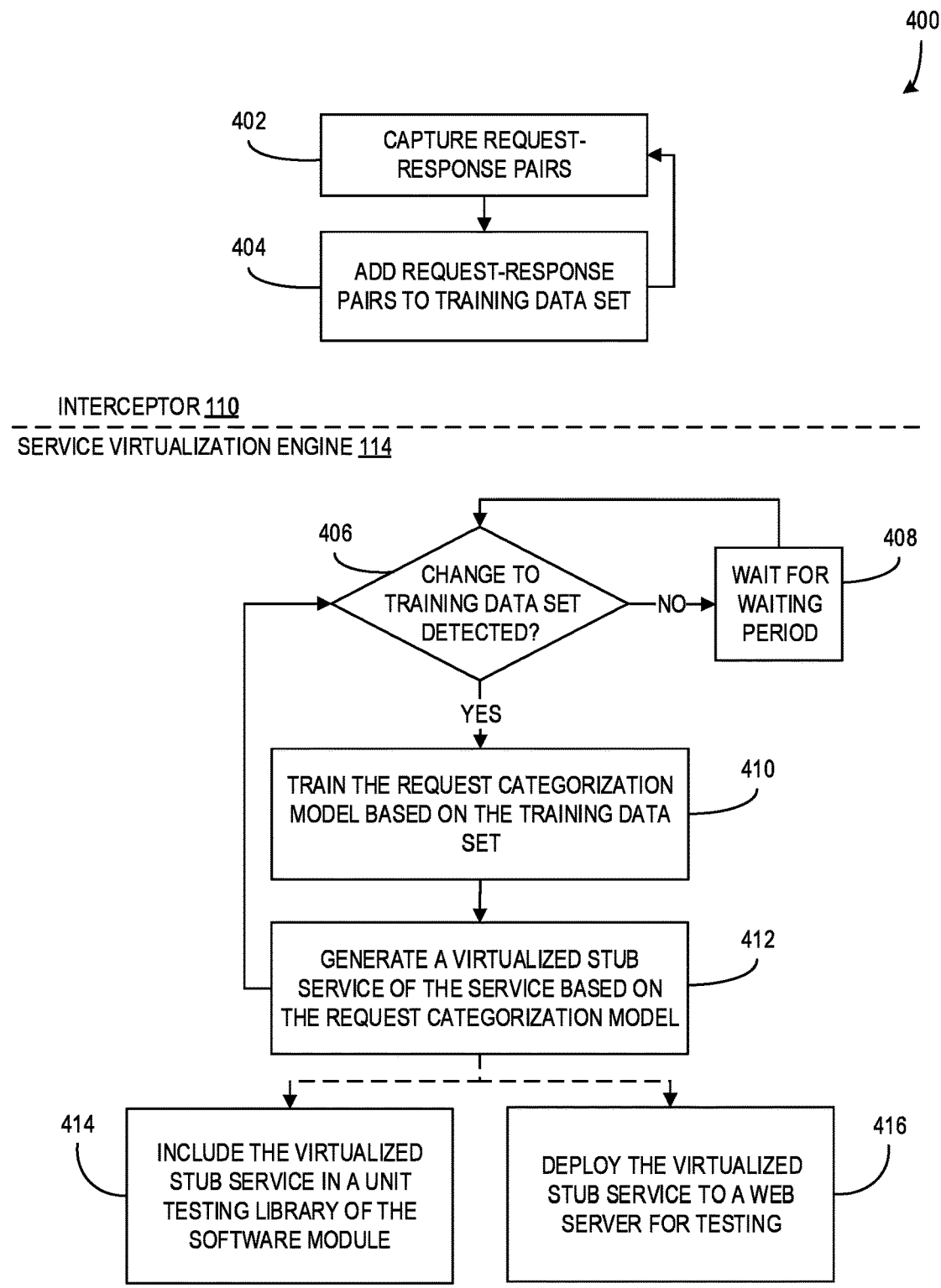
FIG. 4 is a flow chart illustrating a method of intercepting request-response pairs and generating a virtualized stub service based on the intercepted request-response pairs according to an embodiment.

FIG. 4 is a flow chart illustrating a method 400 of intercepting request-response pairs (e.g., request-response pairs 112) and generating a virtualized stub service (e.g., virtualized stub service 128) based on the intercepted request-response pairs according to an embodiment. In some examples, the method 400 is implemented and/or executed by the interceptor 110 and the service virtualization engine 114 of the system 100 as illustrated.

At 402-404, the interceptor 110 performs operations independently and/or asynchronously from the service virtualization engine 114. At 402, the interceptor 110 captures request-response pairs and, at 404, the interceptor 110 adds the captured request-response pairs to the training data set as described herein. In some examples, the interceptor 110 adds the request-response pairs to the training data set as they are captured. Alternatively, the interceptor 110 may capture request-response pairs up to a defined batch size and then, upon reaching the batch size of request-response pairs, the interceptor 110 writes the entire batch of request-response pairs to the training data set at 404.

At 406-416, the service virtualization engine 114 performs operations independently and/or asynchronously from the interceptor 110. At 406, the engine 114 detects when changes are made to the training data set by the interceptor 110 or other entity. If no change to the training data set is detected at 406, the process proceeds to 408. Alternatively, if a change to the training data set is detected, the process proceeds to 410.

At 408, the service virtualization engine 114 waits for a defined waiting period before checking the training data set for changes again at 406. In some examples, changes to the training data set occur frequently, and it may be advantageous to prevent the engine 114 from initiating training of the request categorization model at 410 in response to every small change to the training data set. The waiting period may be defined (e.g., 10 minutes, 1 hour, 1 day, etc.) to ensure that the training of the request categorization model is kept sufficiently up-to-date, but that it is not initiated in response to each and every request-response pair added to the training data set.

Alternatively, or additionally, detecting changes to the training data set and the associated waiting period may be based on a number of request-response pairs added to the training data set since the last training operation. In some examples, the process does not proceed to 410 to initiate a training operation until the amount of changes and/or number of request-response pairs added to the training data set exceeds a defined change threshold (e.g., 100 pairs added, 1000 changes made, etc.). Further, the waiting period at 408 may be adjusted depending on how close the number of changes made to the training data set is to the defined change threshold (e.g., the waiting period may be shortened if the number of changes is greater than 75% of the defined change threshold).

Upon changes to the training data set being detected at 406 as described herein, at 410, the request categorization model is trained based on the training data set as described above. In some examples, the request categorization model has previously been trained based on a previous version of the training data set and, at 410, training the model is based only on the newly added request-response pairs to the training data set since the previous training operation. Alternatively, in some examples, the model is trained based on the entire training data set, including retraining based on request-response pairs with which the model has already been trained.

After the request categorization model is trained at 410, a virtualized stub service is generated based on the request categorization model, at 412, as described herein. Once the virtualized stub service is generated, the service virtualization engine 114 returns to detecting changes to the training data set at 406. Further, using the virtualized stub service that is generated at 412 may include, at 414, including the virtualized stub service in a unit testing library (e.g., unit testing library 232) of the associated software module (e.g., software module 102), as described above with respect to FIG. 2A, and/or, at 416, deploying the virtualized stub service to a web server (e.g., web server 236) for testing, as described above with respect to FIG. 2B. In some examples, the generated virtualized stub service is stored by the service virtualization engine 114 in a form that enables the virtualized stub service to be used in either the unit testing library at 414 or the web server at 416 as necessary based on future testing requirements.

In further examples, virtualized stub services generated at 412 are versioned and stored by the service virtualization engine 114. Different versions of the generated stub services may be accessed and used in testing the software module, even after a more up-to-date version of the stub service has been generated. Thus, tests that use the generated stub services may be performed based on a large variety of different versions of stub services to account for different versions of the associated service or the like.

Additional Example Scenarios

Aspects of the disclosure enable various additional scenarios, such as next described.

In an example, a web service API is in development. The web service API is to be used for an online bicycle store sales application. This back-end API provides functionality that includes inventory tracking, order processing, and other features. The platform is designed using a micro service architecture, which allows multiple teams to develop individual services independently. The result is an increased speed-to market, better scalability, and the ability to version small components without impacting the entire system. Two preliminary services are defined as an "addToCart" service and a "checkInventory" service.

The addToCart service allows potential customers to select a bike for addition to a virtual shopping cart, after which the purchase process can continue. Before customers can add an item to the cart, the application must determine if the item is available in the warehouse. Thus, the addToCart service calls the checkInventory service, which is configured to perform an inventory check for the item being added to the cart and providing a response that includes information indicating whether the item is in stock and/or how many of the item are in stock, among other information.

The interaction between the addToCart service and checkInventory service has several possible permutations based on the item that is being added to the cart. The addToCart service is configured to react accordingly when the inventory check reveals that the item is in stock, backordered, unavailable, or that it does not exist.

As development proceeds on the two services, it becomes clear that the addToCart service is highly dependent on the checkInventory service because items cannot be added to the virtual cart without a successful inventory check. However, because the development of the services is occurring in parallel, the checkInventory service is not available in its final form for use during the development of the addToCart service. Further, the checkInventory service uses persistent data storage to track and maintain inventory information and includes several important simulation requirements, such as several types of response values that may be returned, including positive and negative responses.

As the addToCart service and checkInventory service are being developed, the system includes a service virtualization engine as described herein with several interceptors that capture requests and responses of the two services throughout the development process. Those captured requests and responses are stored as a training data set and a request categorization model associated with the addToCart service is trained based thereon. The service virtualization engine then generates a virtualized stub service of the checkInventory service for use in testing the addToCart service. The virtualized stub service is configured to respond to checkInventory requests from the addToCart service with accurate responses as described herein.

Some example request-response pairs are listed below:

```
Item In-Stock Request:
{
    "items": {
        "item": [
            {
                "sku": "XX-XXXX-XXXXXX",
                "quantity": 1
            }
        ]
    }
}
Item In-Stock Response:
{
    "items": {
        "item": [
            {
                "sku": "XX-XXXX-XXXXXX",
                "availability": "IN_STOCK",
```

-continued

```
                "InventoryCount": 12
            }
        ]
    }
}
Item on Backorder Request:
{
    "items": {
        "item": [
            {
                "sku": "YY-YYYY-YYYYYY",
                "quantity": 1
            }
        ]
    }
}
Item on Backorder Response:
{
    "items": {
        "item": [
            {
                "sku": "YY-YYYY-YYYYYY",
                "availability": "BACKORDER",
                "expectedRestockDate": "01-01-2020"
            }
        ]
    }
}
Item Discontinued Request:
{
    "items": {
        "item": [
            {
                "sku": "ZZ-ZZZZ-ZZZZZZ",
                "quantity": 1
            }
        ]
    }
}
Item Discontinued Response:
{
    "items": {
        "item": [
            {
                "sku": "ZZ-ZZZZ-ZZZZZZ",
                "availability": "DISCONTINUED"
            }
        ]
    }
}
Item Invalid Request:
{
    "items": {
        "item": [
            {
                "sku": "invalid-sku",
                "quantity": 1
            }
        ]
    }
}
Item Invalid Response:
{
    "items": {
        "item": [
            {
                "sku": "invalid-sku",
                "message": "Invalid SKU"
            }
        ]
    }
}
Invalid Format Request:
{
    "itemNumber": "invalid-format",
}
```

```
Invalid Format Response:
{
    "message": "Invalid Request Format
}
```

Each of the request-response pairs of the above examples may be included in the training data set of the service virtualization engine. Such request-response pairs may be captured during initial testing of the addToCart and check-Inventory services. In some examples, the service virtualization engine trains the model based on patterns in the format of the request and associated response (e.g., the nested braces) and/or the content of the various data values (e.g., the numbers in the "sku" fields, the other fields in the various types of responses, etc.). In a further example, the model is trained to check the format of the request and respond with an "Invalid Format Response" when the request does not match a set of request format-based ground truth rules defined within the service virtualization engine.

Exemplary Operating Environment

Figure 5:
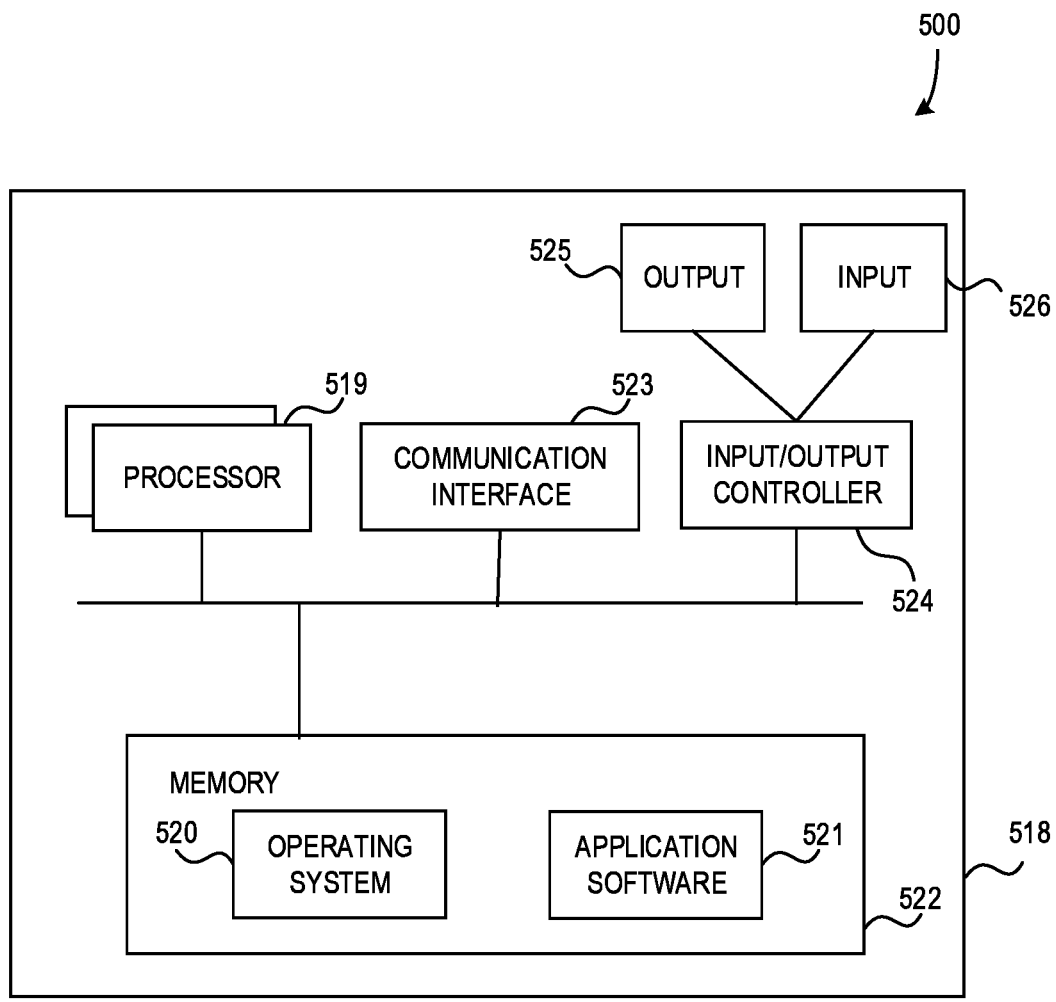
FIG. 5 illustrates a computing apparatus according to an embodiment as a functional block diagram.

The present disclosure is operable with a computing apparatus according to an embodiment as a functional block diagram 500 in FIG. 5. In an embodiment, components of a computing apparatus 518 may be implemented as a part of an electronic device according to one or more embodiments described in this specification. The computing apparatus 518 comprises one or more processors 519 which may be microprocessors, controllers or any other suitable type of processors for processing computer executable instructions to control the operation of the electronic device. Alternatively, or in addition, the processor 519 is any technology capable of executing logic or instructions, such as a hard-coded machine. Platform software comprising an operating system 520 or any other suitable platform software may be provided on the apparatus 518 to enable application software 521 to be executed on the device. According to an embodiment, generating a virtualized stub service based on deep learning for use in simulating a service during testing of a software module configured to interact with the service as described herein may be accomplished by software, hardware, and/or firmware.

Computer executable instructions may be provided using any computer-readable media that are accessible by the computing apparatus 518. Computer-readable media may include, for example, computer storage media such as a memory 522 and communications media. Computer storage media, such as a memory 522, include volatile and non-volatile, removable and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, CD-ROM, digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 522) is shown within the computing apparatus 518, it will be appreciated by a person skilled in the art, that the storage may be distributed or located remotely and accessed via a network or other communication link (e.g. using a communication interface 523).

The computing apparatus 518 may comprise an input/output controller 524 configured to output information to one or more output devices 525, for example a display or a speaker, which may be separate from or integral to the electronic device. The input/output controller 524 may also be configured to receive and process an input from one or more input devices 526, for example, a keyboard, a microphone or a touchpad. In one embodiment, the output device 525 may also act as the input device. An example of such a device may be a touch sensitive display. The input/output controller 524 may also output data to devices other than the output device, e.g. a locally connected printing device. In some embodiments, a user may provide input to the input device(s) 526 and/or receive output from the output device(s) 525.

The functionality described herein can be performed, at least in part, by one or more hardware logic components. According to an embodiment, the computing apparatus 518 is configured by the program code when executed by the processor 519 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example computer system comprises: at least one processor; and at least one memory comprising computer program code, the at least one memory and the computer program code configured to, with the at least one processor, cause the at least one processor to: capture, by an interceptor module, request-response pairs between the software module and the service, each request-response pair including a request and a response to the request; add, by the interceptor module, the captured request-response pairs to a training data set; train, by a service virtualization engine, a request categorization model based on the training data set, wherein the request categorization model is trained to respond to requests with responses based on the request-response pairs of the training data set; and generate, by the service virtualization engine, a virtualized stub service for the service based on the trained request categorization model, wherein the virtualized stub service is configured to respond to requests from the software module with responses during testing of the software module.

A computerized method for generating a virtualized stub service based on deep learning for use in simulating a service during testing of a software module configured to interact with the service comprises: capturing, by an interceptor module, request-response pairs between the software module and the service, each request-response pair including a request and a response to the request; adding, by the interceptor module, the captured request-response pairs to a training data set; training, by a service virtualization engine, a request categorization model based on the training data set, wherein the request categorization model is trained to respond to requests with responses based on the request-response pairs of the training data set; and generating, by the service virtualization engine, a virtualized stub service for the service based on the trained request categorization model, wherein the virtualized stub service is configured to respond to requests from the software module with responses during testing of the software module.

One or more exemplary non-transitory computer readable storage media having computer-executable instructions for generating a virtualized stub service based on deep learning for use in simulating a service during testing of a software module configured to interact with the service that, upon execution by a processor, cause the processor to at least: capture, by an interceptor module, request-response pairs between the software module and the service, each request-response pair including a request and a response to the request; add, by the interceptor module, the captured request-response pairs to a training data set; train, by a service virtualization engine, a request categorization model based on the training data set, wherein the request categorization model is trained to respond to requests with responses based on the request-response pairs of the training data set; and generate, by the service virtualization engine, a virtualized stub service for the service based on the trained request categorization model, wherein the virtualized stub service is configured to respond to requests from the software module with responses during testing of the software module.

Alternatively, or in addition to the other examples described herein, examples include any combination of the following:

wherein generating the virtualized stub service includes generating the virtualized stub service as a testing library of the software module, the testing library configured to respond to requests from the software module during unit testing of the software module.

further comprising: deploying the virtualized stub service on a web server; and performing at least one test of the software module, the at least one test including sending, by the software module, a request to the deployed stub service and receiving, by the software module, a response to the request from the deployed stub service.

wherein capturing the request-response pairs between the software module and the service includes capturing the request-response pairs during at least one of unit testing of at least one of the software module or the service, regression testing of at least one of the software module or the service, or general operation of at least one of the software module or the service.

further comprising: receiving at least one ground truth input that defines a specific request and a fixed response to the specific request, wherein training the request categorization model includes training the request categorization model to respond to the specific request with the fixed response.

further comprising: detecting, by the service virtualization engine, new request-response pairs being added to the training data set after generation of a first version of the virtualized stub service based on a first version of the service, wherein the new request-response pairs are associated with a second version of the service; and based on detecting the new request-response pairs being added to the training data set, retraining, by the service virtualization engine, the request categorization model based on the training data set that includes the new request-response pairs; and generating, by the service virtualization engine, a second version of the virtualized stub service based on the retrained request categorization engine and associated with the second version of the service.

further comprising: providing the first version of the virtualized stub service and the second version of the virtualized stub service for testing of the software module, whereby the software module is enabled to be tested based on the first version of the service and the second version of the service.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for capturing request-response pairs between the software module and the service, each request-response pair including a request and a response to the request; exemplary means for adding the captured request-response pairs to a training data set; exemplary means for training a request categorization model based on the training data set, wherein the request categorization model is trained to respond to requests with responses based on the request-response pairs of the training data set; and exemplary means for generating, by the service virtualization engine, a virtualized stub service for the service based on the trained request categorization model, wherein the virtualized stub service is configured to respond to requests from the software module with responses during testing of the software module.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for generating a virtualized stub service based on deep learning for use in simulating a service, the system comprising:
    at least one processor; and
    at least one memory comprising computer program code, the at least one memory and the computer program code configured to, with the at least one processor, cause the at least one processor to:
        capture, by an interceptor module, request-response pairs between a software module and the service, each request-response pair including a request and a response to the request;
        add, by the interceptor module, the captured request-response pairs to a training data set;
        train, by a service virtualization engine, a request categorization model based on the training data set and a ground truth rule defined to identify invalid formatting of an input request, wherein the request categorization model is trained to respond to requests with responses based on the request-response pairs of the training data set;
        evaluate validity of a request format of the input request against the ground truth rule;
        responsive to a valid input request, map the input request to an output response based on a request category map associated with the request categorization model;
        responsive to an invalid input request, automatically respond to the invalid input request with a fixed response, wherein the output response mapped to the invalid input request is overridden by the ground truth rule;
        determine the output response to the input request based on application of the request category map and the ground truth rule, the request category map is adjusted during training based on new request-response pairs being added to the training data set; and
        generate, by the service virtualization engine, a virtualized stub service for the service based on the trained request categorization model, wherein the virtualized stub service is configured to respond to requests from the software module with responses during testing of the software module.

2. The system of claim 1, wherein generating the virtualized stub service includes generating the virtualized stub service as a testing library of the software module, the testing library configured to respond to requests from the software module during unit testing of the software module.

3. The system of claim 1, wherein the at least one memory and the computer program code are configured to further cause the at least one processor to:
    deploy the virtualized stub service on a web server; and
    perform at least one test of the software module, the at least one test including sending, by the software module, a request to the deployed stub service and receiving, by the software module, a response to the request from the deployed stub service.

4. The system of claim 1, wherein the at least one memory and the computer program code are configured to further cause the at least one processor to:
evaluate every received request against the ground truth rule to identify invalid formatting.

5. The system of claim 1, wherein the at least one memory and the computer program code are configured to further cause the at least one processor to:
receive at least one ground truth rule that defines a specific request and a fixed response to the specific request, wherein training the request categorization model includes training the request categorization model to respond to the specific request with the fixed response, wherein the at least one ground truth rule is defined to identify invalid formatting of a received request; and
provide the fixed response, including an invalid request format message on condition the invalid formatting of the received request is identified, wherein the request categorization model evaluates validity of format of a received request against the at least one ground truth rule for every received request and automatically responds with the invalid request format message.

6. The system of claim 1, wherein the at least one memory and the computer program code are configured to further cause the at least one processor to:
detect, by the service virtualization engine, new request-response pairs being added to the training data set after generation of a first version of the virtualized stub service based on a first version of the service, wherein the new request-response pairs are associated with a second version of the service; and
based on detecting the new request-response pairs being added to the training data set, retrain, by the service virtualization engine, the request categorization model based on the training data set that includes the new request-response pairs; and
generate, by the service virtualization engine, a second version of the virtualized stub service based on the retrained request categorization model and associated with the second version of the service.

7. The system of claim 6, wherein the at least one memory and the computer program code are configured to further cause the at least one processor to:
provide the first version of the virtualized stub service and the second version of the virtualized stub service for testing of the software module, whereby the software module is enabled to be tested based on the first version of the service and the second version of the service, wherein the request categorization model associated with the first version of the virtualized stub service is iteratively trained based on an updated training data set as new request-response pairs are captured and added to the updated training data set to generate the second version of the virtualized stub service.

8. A computerized method for generating a virtualized stub service based on deep learning for use in simulating a service during testing of a software module configured to interact with the service, the method comprising:
capturing, by an interceptor module, request-response pairs between the software module and the service, each request-response pair including a request and a response to the request;
adding, by the interceptor module, the captured request-response pairs to a training data set;
training, by a service virtualization engine, a request categorization model based on the training data set and a ground truth rule defined to identify invalid formatting of an input request, wherein the request categorization model is trained to respond to requests with responses based on the request-response pairs of the training data set;
evaluate validity of a request format of the input request against the ground truth rule;
responsive to a valid input request, map the input request to an output response based on a request category map associated with the request categorization model;
responsive to an invalid input request, automatically respond to the invalid input request with a fixed response, wherein the output response mapped to the invalid input request is overridden by the ground truth rule;
determining the output response to the input request based on application of the request category map, the request category map is adjusted during training based on new request-response pairs being added to the training data set; and
generating, by the service virtualization engine, a virtualized stub service for the service based on the trained request categorization model, wherein the virtualized stub service is configured to respond to requests from the software module with responses during testing of the software module.

9. The computerized method of claim 8, wherein the at least one memory and the computer program code are configured to further cause the at least one processor to:
evaluate every received request against the ground truth rule to identify invalid formatting.

10. The computerized method of claim 8, further comprising:
deploying the virtualized stub service on a web server; and
performing at least one test of the software module, the at least one test including sending, by the software module, a request to the deployed virtualized stub service and receiving, by the software module, a response to the request from the deployed virtualized stub service.

11. The computerized method of claim 8, wherein capturing the request-response pairs between the software module and the service includes capturing the request-response pairs during at least one of unit testing of at least one of the software module or the service, regression testing of at least one of the software module or the service, or general operation of at least one of the software module or the service.

12. The computerized method of claim 8, further comprising:
receiving a set of format-based ground truth rules that defines fixed responses to specific requests, wherein training the request categorization model includes training the request categorization model to respond to the specific requests with the fixed responses.

13. The computerized method of claim 12, wherein the set of format-based ground truth rules are defined to identify invalid formatting of a received request, and further comprising:
providing the fixed responses, including an invalid request format message on condition the invalid formatting of the received request is identified, wherein the request categorization model evaluates validity of format of a received request against the at least one ground truth rule for every received request and automatically responds with the invalid request format message.

14. The computerized method of claim 8, further comprising:
detecting, by the service virtualization engine, new request-response pairs being added to the training data set after generation of a first version of the virtualized stub service based on a first version of the service, wherein the new request-response pairs are associated with a second version of the service; and
based on detecting the new request-response pairs being added to the training data set, retraining, by the service virtualization engine, the request categorization model based on the training data set that includes the new request-response pairs; and
generating, by the service virtualization engine, a second version of the virtualized stub service based on the retrained request categorization engine and associated with the second version of the service.

15. One or more non-transitory computer storage media having computer-executable instructions for generating a virtualized stub service based on deep learning for use in simulating a service during testing of a software module configured to interact with the service that, upon execution by a processor, cause the processor to at least:
capture, by an interceptor module, request-response pairs between the software module and the service, each request-response pair including a request and a response to the request;
add, by the interceptor module, the captured request-response pairs to a training data set;
train, by a service virtualization engine, a request categorization model based on the training data set and a ground truth rule defined to identify invalid formatting of an input request, wherein the request categorization model is trained to respond to requests with responses based on the request-response pairs of the training data set;
evaluate validity of a request format of the input request against the ground truth rule;
responsive to a valid input request, map the input request to an output response based on the request category map associated with the request categorization model;
responsive to an invalid input request, automatically respond to the invalid input request with a fixed response, wherein the output response mapped to the invalid input request is overridden by the ground truth rule;
determine the output response to the input request based on application of the request category map and the ground truth rule, the request category map is adjusted during training based on new request-response pairs being added to the training data set; and
generate, by the service virtualization engine, the virtualized stub service for the service based on the trained request categorization model, wherein the virtualized stub service is configured to respond to requests from the software module with responses during testing of the software module.

16. The one or more computer storage media of claim 15, wherein generating the virtualized stub service includes generating the virtualized stub service as a testing library of the software module, the testing library configured to respond to requests from the software module during unit testing of the software module.

17. The one or more computer storage media of claim 15, wherein the computer-executable instructions, upon execution by a processor, further cause the processor to at least:
deploy the virtualized stub service on a web server; and
perform at least one test of the software module, the at least one test including sending, by the software module, a request to the deployed stub service and receiving, by the software module, a response to the request from the deployed stub service.

18. The one or more computer storage media of claim 15, wherein the computer-executable instructions, upon execution by a processor, further cause the processor to at least:
evaluate every received request against the ground truth rule to identify invalid formatting.

19. The one or more computer storage media of claim 15, wherein the computer-executable instructions, upon execution by a processor, further cause the processor to at least:
receive at least one ground truth rule that defines a specific request and a fixed response to the specific request, wherein training the request categorization model includes training the request categorization model to respond to the specific request with the fixed response, wherein the at least one ground truth rule is defined to identify invalid formatting of a received request provide the fixed response, including an invalid request format message on condition the invalid formatting of the received request is identified, wherein the trained request categorization model evaluates the validity of format of a received request against the at least one ground truth rule for every received request and automatically responds with the invalid request format message.

20. The one or more computer storage media of claim 15, wherein the computer-executable instructions, upon execution by a processor, further cause the processor to at least:
detect, by the service virtualization engine, new request-response pairs being added to the training data set after generation of a first version of the virtualized stub service based on a first version of the service, wherein the new request-response pairs are associated with a second version of the service;
based on detecting the new request-response pairs being added to the training data set, retrain, by the service virtualization engine, the request categorization model based on the training data set that includes the new request-response pairs; and
generate, by the service virtualization engine, a second version of the virtualized stub service based on the retrained request categorization model and associated with the second version of the service.

* * * * *